United States Patent [19]

Thiele et al.

[11] Patent Number: 5,766,288
[45] Date of Patent: Jun. 16, 1998

[54] MULTILAYERED DEEP-BED FILTER MATERIAL

[75] Inventors: Reiner Thiele, Uetze; Henrik Badt, Dortmund, both of Germany

[73] Assignees: Corovin GmbH, Peine; Kalthoff Luftfilter und Filtermedien GmbH, Selm, both of Germany

[21] Appl. No.: 505,278

[22] PCT Filed: Dec. 28, 1994

[86] PCT No.: PCT/DE94/01552

§ 371 Date: Oct. 6, 1995

§ 102(e) Date: Oct. 6, 1995

[87] PCT Pub. No.: WO95/17946

PCT Pub. Date: Aug. 25, 1995

[30] Foreign Application Priority Data

Dec. 31, 1993 [DE] Germany ............ 9320208 U

[51] Int. Cl.⁶ .................................................. B01D 39/16
[52] U.S. Cl. .................... 55/486; 55/487; 55/527; 55/528; 210/491; 210/505
[58] Field of Search ............... 95/286, 287; 55/486, 55/487, 488, 489, 527, 528, 522; 210/503, 505, 491, 489

[56] References Cited

U.S. PATENT DOCUMENTS

| | | | |
|---|---|---|---|
| 2,692,654 | 10/1954 | Pryor | 55/487 |
| 3,400,520 | 9/1968 | Sakurai | 55/487 |
| 3,726,597 | 4/1973 | Mesek et al. | 55/487 |
| 4,093,437 | 6/1978 | Ichihara et al. | 55/487 |
| 4,504,290 | 3/1985 | Pontius | 55/486 |
| 4,518,402 | 5/1985 | Dargel | 55/489 |
| 4,545,628 | 10/1985 | Miyake et al. | 55/487 |
| 4,548,628 | 10/1985 | Miyake et al. | 55/487 |
| 4,612,237 | 9/1986 | Frankenburg | 55/528 |
| 4,661,255 | 4/1987 | Aumann et al. | 210/491 |
| 4,784,892 | 11/1988 | Storey et al. | 55/528 |
| 4,917,942 | 4/1990 | Winters | 55/486 |
| 4,976,858 | 12/1990 | Kadoya | 55/486 |
| 4,983,193 | 1/1991 | Tani et al. | 55/528 |
| 5,230,800 | 7/1993 | Nelson | 210/496 |
| 5,269,925 | 12/1993 | Broadhurst | 55/487 |
| 5,419,953 | 5/1995 | Chapman | 55/486 |
| 5,496,627 | 3/1996 | Bagrodia et al. | 55/488 |
| 5,540,756 | 7/1996 | Hoppitt et al. | 55/486 |

FOREIGN PATENT DOCUMENTS

| | | | |
|---|---|---|---|
| 0 092 819 | 11/1983 | European Pat. Off. | |
| 0 106 908 | 5/1984 | European Pat. Off. | |
| 0 338 479 | 10/1989 | European Pat. Off. | |
| 39 20 066 | 5/1991 | Germany | |
| 9218021 U | 9/1993 | Germany | |
| 55-99315 | 7/1980 | Japan | 55/486 |
| WO 94/01198 | 1/1994 | WIPO | |

OTHER PUBLICATIONS

"Analyse der Struktur technischer Tiefenfilter", *Staub Reinhaltung der Luft*, Elke Schweers et al., 53 (1993) Mar., No. 3, Berlin, Germany, pp. 101–107.

*Primary Examiner*—Duane S. Smith
*Attorney, Agent, or Firm*—Burns, Doane, Swecker & Mathis, L.L.P.

[57] ABSTRACT

Multilayered filter material is provided with at least two layers having different filter properties (coarse filter layer and fine filter layer), for which the separation ratio of the coarse filter layer is selected depending on the number of layers of the filter material as well as the total separation ratio of the complete filter material. The separation ratio of the first layer is proportioned such that at least 20% of the total particles are filtered out by it. The first layer has a porosity of at least 95%. For the remaining filtration of the fine particles, at least one fine filter layer is present, which has a porosity of somewhat greater than 85%.

18 Claims, No Drawings

MULTILAYERED DEEP-BED FILTER MATERIAL

The invention relates to a multilayered deep-bed filter material that provides improved service characteristics during the removal of solid particles of differing sizes from air.

A multilayered filter material is known from the German utility patent G 92 18 021.3. The first layer, which works as a coarse filter, is formed by a fleece made of synthetic and/or natural fibers, while the second layer forming the fine filter is a melt-blown microfiber fleece. Through the multilayered construction of the filter material, an optimization of the deep filtration is to be effected in such a manner that coarse particles are retained in the coarse filter layer and the finest particles passing the coarse filter layer are captured in the fine filter of the second layer.

The known filter material does not satisfy these requirements in all points, however. For the first layer which works as a coarse filter layer, there is the danger that a complete preliminary filtration of the coarse particles as well as a distinct reduction in the total quantity of particles of the medium to be filtered (e.g., air) are not possible, such that the desired even disposition of dust dispersion throughout the entire depth of the filter layer can not be achieved and thus the service life and the cost efficiency of the filter are reduced.

The filter effect of the known coarse filter layer is insufficient in many cases. The coarse particles are not filtered evenly over the thickness of the layer of the complete filter material, but rather are stored largely in the area where the second layer, the fine filter layer, attaches to the first layer. There is also the danger that the coarse particles will concentrate and cake on the filter on the surface of the first layer. This can cause the formation of a filter cake in this area, which leads to a blockage of the filter material. Because of this, the pressure differential on the filter material increases after a short time to higher values and this leads to an undesired short service life of the filter material.

The invention has the objective of creating a multilayered filter material in particular for air filtration, which excels through an improved degree or ratio of filtration and also provides economic efficiencies during operation, and which as a result exhibits lower pressure drops over a longer period of time and is marked by long service life. To this end, it should be possible to dimension the filter material in regard to the given separation ratio in a simple manner.

In the invention, the degree of separation refers to the ratio of the particles filtered by or captured in the filter material to the total particles present in the medium, whereby the separation ratio is given in percent and is normally smaller than 100%.

In contrast to this, the separation ratio is understood to mean the degree of separation relative to a concrete particle size. Furthermore, the average separation ratio is understood to mean the degree of separation which relates to a defined particle collective, that is to say to particles within a definite order of size.

A main point of the invention is the configuration of the first layer of the filter material, which forms the coarse filter layer. This first layer is assigned a significantly improved filtering effect and a higher filtering efficiency, whereby a significant aspect of the invention is to select the filtering efficiency of the first layer dependent on the desired filtering efficiency of the compete filter material. The higher the filtering efficiency or separation ratio is, the higher the filtering efficiency or separation ratio of the first layer should be.

In addition, the first layer has a high porosity of about 95%. At least a second layer, and one or more additional fine filter layers, if desired, serve to filter out the fine particles that are not captured by the first layer. The porosity of the second layer and, if desired, additional layers, amounts to more than about 85%.

In the invention, the first layer causes an optimal filtering of the coarse particles and that in a manner such that the coarse particles are retained and distributed substantially evenly over the entire thickness of the first layer and do not concentrate at the transition point to the second layer or already on the surface of the first layer. This is due largely to the porosity associated with the first layer. In general, an improvement of the deep filtration results in the filter material according to the invention, in that the coarse particles are captured in the coarse particle filter and the fine particles are captured in the fine particle filter. Thus the pressure differential can be kept low over a longer period of time, which leads to a long service life of the filter material, as desired.

A further main point of the invention is the fundamental consideration of the positioning of the individual layers in relation to one another such that a fractionated or graduated filtration of all the particles in the individual layers takes place. For this, filtration or separation of an increased number of coarse particles occurs at the entry side of the filter material (seen in the flowthrough direction of the filter material) or in the layers lying on the entry side, while in the layers found at the discharge side, an increased number of fine particles are separated. From this, a decisive advantage of the invention results, which is to provide a controllable and as even a particle retention as possible in the individual layers, in order to achieve long service lives which are desired for the respective filter class in regard to certain characteristic sizes.

Therefore, it is important in the sense of the invention that continual transitions in the boundary layers result between the individual layers of the filter material, and that in these boundary layers no uncontrolled blockages result because of separated particles.

The invention makes it possible to produce both high filtration combinations (HEPA/ULPA filtration) as well as particularly economical filter materials with long service lives through the appropriate construction and arrangement of individual layers. The advantage is that the filter's filtering efficiency or separation ratio of the individual layers is independent of the physical properties of the dust particles to be separated out and thus a high measure of "fail-safe" behavior is achieved.

In accordance with an advantageous embodiment of the invention, the construction of the individual layers of the filter material takes place in accordance with the formula $$T(x) = 1 - \exp\{-f^* phi(x)\}$$

where: $T(x)$ is the separation ratio as a function of the particle size x; f=dimensionless filter parameter which is dependent only on the geometric size of a filter; phi= individual fiber separation ratio; and phi (x) depends on the particle and fiber properties.

According to another suitable embodiment of the invention, mixing zones exist between adjacent layers, which contain a mixture of the fibers of the adjacent layers. The filter material is manufactured and the fibers are arranged and oriented in the mixing zones in such a way that the permeability of the filter material is not significantly influenced by the existence of these mixing zones. In particular, the basic idea of the gradual and fractionated filtration of the particles in the individual layers is maintained.

In accordance with another advantageous embodiment of the invention, the first layer is formed from a mixture of synthetic fibers and microfibers with an average fiber diameter of less than or equal to 15 μm. The first coarse filter layer advantageously can be a fleece material selected from natural fibers, synthetic staple fibers, synthetic continuous fibers, and a mixture of these. In a preferred embodiment, the first coarse filter layer comprises a mixture of polyester binding fibers, polyester fibers, and polyester microfibers having fiber titer of less than or equal to 1 dtex. In a further preferred embodiment, the first coarse filter layer comprises a mixture of polyester fibers of 2.0 dtex, polyester fibers of 1.3 dtex, and polyester fibers of 0.8 dtex.

In a preferred embodiment, the porosity of the second fine filter layer is greater than 93%. It is recommended that when fine particles smaller than 10 μm are present that at least one additional fine filter layer be provided in the multilayered deep-bed filter material of the present invention. Also, a microporous membrane optionally is included with the second fine filter layer.

Through this, one achieves in a particularly favorable manner the dust deposition, which is generally achieved with the invention and which is even over the depth of the filter layer, as well as high dust storage capacity and long service life. This can be attributed to the large fiber surface of the fibers which is available for the entire particle filtration, whereby the large inner fiber surface and the high dust storage capacity are significant advantages of the invention.

In another suitable embodiment of the invention, the last layer lying at the end of the filter material in the flowthrough direction is connected with a spun fleece as a mechanical carrier, whereby the fibers of the last layer and of the carrier can be at least partially mixed together.

The last layer (fine filter layer) and the mechanical carrier, which is in the form of a spun fleece, are thus formed by a composite fleece material from at least two components, namely from largely continuous, coarse filaments with relatively large diameters and from largely discontinuous fine microfibers with relatively small diameters, whereby the composite fleece material is formed by a mixture of the noted components without a discrete phase boundary between the components and whereby the composite fleece material is produced in an integrated fleece production process on one and the same lay-down equipment of a fleece spinning system.

Such a composite fleece material which can be used in the invention in an advantageous manner is known and is described in more detail in DE 39 20 066 C2.

Furthermore, in a further embodiment of the invention, another coarse filter layer can be arranged in front of the first layer, which with the first layer together forms a multilayered coarse filter of the total filter material.

Within the scope of the invention, it is also possible to add to the second layer and if appropriate, to additional fine filter layers, short fibers in the form of staple fibers or active charcoal fibers or even particulate solids, whereby these additions improve the filtering properties of the respective layers.

According to another suitable embodiment of the invention, one may electrostatically charge one or more layers of the filter material either positively or negatively, so that the filtering properties of the affected layers are improved.

In accordance with a preferred embodiment of the invention, the filter material composed of a first layer, which acts as a coarse filter, and of a second layer which works as a fine filter is combined with a carrier and has the following characteristics, whereby this filter material can be used for filtration of room air in filter class EU7 (in accordance with DIN 24185 or F7 in accordance with EN 779).

First Layer: A polyester staple fiber fleece material is used as the material; the surface weight amounts to 120 g/m$^2$; porosity is greater than 98%; fiber diameter is about 12 μm; layer thickness about 5 mm.

Second Layer and Carrier: The second layer and the carrier together form a composite fleece material which is known by itself, made from two components, whereby spun fleece fibers as well as melt-blown fibers are used; the melt-blown fibers (microfibers) consist of PP (polypropylene); the surface weight of the composite fleece material (the second layer and the carrier together) amounts to 70 g/m$^2$; layer thickness is about 2 mm; porosity is about 96%; average fiber diameter of the microfibers about 2 μm; average fiber diameter of the spun fleece fibers about 20 μm.

The fine filter layers provided in the invention can be used in an advantageous manner in filters for suspended matters or HEPA filters. Of these filters, which have a very high particle holding capacity, somewhat more than 99% for the very fine 0.3 μm particles, a very high filtration assurance (fail-safe) is demanded. Precisely for this, the fine filter material according to the invention is very well suited because of its good fail-safe behavior.

We claim:

1. A multilayered deep-bed filter material for the collection of solid particles of differing sizes made of synthetic fiber fleece material comprising at least two layers having different filter properties, one being a first coarse filter layer for the collection of coarse particles substantially evenly over the entire thickness of such layer and the other being a second fine filter layer for the collection of fine particles, wherein the separation ratio of said first coarse filter layer is selected depending on the number of layers present in the entire filter material as well as the total separation ratio of the entire filter material, and wherein the separation ratio of said first layer is selected such that within said first coarse filter layer at least 20% of the total particles are filtered out and said first coarse layer has a porosity of at least 95%, and that for the remaining filtration of the fine particles at least one second fine filter layer is provided which has a porosity greater than 85%.

2. A multilayered deep-bed filter material as in claim 1, wherein said first coarse filter layer is formed of a fleece material selected from the group consisting of natural fibers, synthetic staple fibers, synthetic continuous fibers, and mixtures of the foregoing.

3. A multilayered deep-bed filter material as in claim 1, wherein said adjacent coarse and fine filter layers lie next to one another, such that they partially penetrate one another and mixing zones exist between them which comprise a mixture of the fibers of the adjacent layers, and said mixing zones are so designed so that they do not significantly affect the permeability of said multilayered deep-bed filter material.

4. A multilayered deep-bed filter material as in claim 1, wherein said first coarse filter layer is formed by a mixture of synthetic fibers and microfibers with an average fiber diameter of less than or equal to 15 μm.

5. A multilayered deep-bed filter material as in claim 1, wherein said first coarse filter layer comprises a mixture of polyester binding fibers, polyester fibers, and polyester microfibers having a fiber titer of less than or equal to 1 dtex.

6. A multilayered deep-bed filter material as in claim 5, wherein said first coarse filter layer comprises a mixture of polyester binding fibers of 2.0 dtex, polyester fibers of 1.3 dtex, and polyester fibers of 0.8 dtex.

7. A multilayered deep-bed filter material as in claim 1, wherein said second fine filter layer comprises microfibers produced by the melt-blown method.

8. A multilayered deep-bed filter material as in claim 1, wherein the porosity of said second fine filter layer is greater than 93%.

9. A multilayered deep-bed filter material as in claim 1, wherein the surface weight of said second fine filter layer is greater than 20 g/m$^2$.

10. A multilayered deep-bed filter material as in claim 1, wherein a microporous membrane is included with said second fine filter layer.

11. A multilayered deep-bed filter material as in claim 1, wherein the last second fine filter layer which lies at the end of the filter material in the flow-through direction is connected to a spun fleece which serves as a mechanical carrier.

12. A multilayered deep-bed filter material as in claim 11, characterized in that the last layer being a second fine filter layer and the mechanical carrier which is formed as a spun fleece are formed of a composite fleece material made of largely continuous coarse filaments with relatively large diameters and largely discontinuous fine microfibers with relatively small diameters whereby the composite fleece material is formed by a mixture of said components without discrete phase boundaries between the components and whereby the composite fleece material is produced in an integrated fleece production process on the same lay-down equipment of a fleece spinning system.

13. A multilayered deep-bed filter material as in claim 1, wherein an initial layer is arranged in front of said first coarse filter layer in the flow-through direction of the filter material.

14. A multilayered deep-bed filter material as in claim 1, wherein short fibers in the form of staple fibers which improve the filter properties of the respective layers are added to said second fine filter layer.

15. A multilayered deep-bed filter material as in claim 1, characterized in that active charcoal fibers, which improve the selective filter properties of the respective layers, are added to said second fine filter layer.

16. A multilayered deep-bed filter material as in claim 1, wherein particulate solids which improve the selective filter properties of the respective layers are added to said second fine filter layer.

17. A multilayered deep-bed filter material as in claim 1, wherein one or more layers of said filter material are electrostatically charged positively or negatively so that the filter properties of the respective layers are improved.

18. A multilayered deep-bed filter material as in claim 1, wherein a carrier is provided on the rear side of said filter material in the flow-through direction.

* * * * *